United States Patent
Kirimoto

(10) Patent No.: US 6,261,695 B1
(45) Date of Patent: Jul. 17, 2001

(54) COATING COMPOSITION, TREATING METHOD AND TREATED SUBSTRATE

(75) Inventor: Kazusuke Kirimoto, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/212,867

(22) Filed: Dec. 17, 1998

(30) Foreign Application Priority Data

Dec. 19, 1997 (JP) .................................................. 9-351506

(51) Int. Cl.⁷ .............................. B32B 27/00; B32B 27/40
(52) U.S. Cl. ...................... 428/423.7; 524/591; 524/589; 524/590; 524/462; 528/49; 528/70; 428/423.1; 428/423.4; 428/423.5; 428/423.9
(58) Field of Search .................................... 524/590, 589, 524/591, 462; 528/49, 70, 73, 76, 80, 85; 428/423.4, 423.5, 423.1, 423.7, 423.9

(56) References Cited

U.S. PATENT DOCUMENTS

| | | | |
|---|---|---|---|
| 4,859,754 | 8/1989 | Maekawa et al. | 526/245 |
| 5,100,954 | 3/1992 | Itoh et al. | 524/805 |
| 5,496,642 | 3/1996 | Martinez et al. | 428/423.1 |
| 5,543,200 | 8/1996 | Hargis et al. | 428/122 |
| 5,578,688 | 11/1996 | Ito et al. | 526/245 |
| 5,672,673 | 9/1997 | Kirchmeyer et al. | 528/70 |
| 5,688,309 | 11/1997 | Shimada et al. | 106/2 |
| 6,001,923 | * 12/1999 | Moncur et al. | 524/590 |

FOREIGN PATENT DOCUMENTS

| | | |
|---|---|---|
| WO 97/14842 | 4/1997 | (WO) . |
| WO 98/34718 | 8/1998 | (WO) . |
| WO 98/44015 | 10/1998 | (WO) . |

* cited by examiner

Primary Examiner—Samuel A. Acquah
Assistant Examiner—U. K. Rajguru
(74) Attorney, Agent, or Firm—Oblon, Spivak, McClelland, Maier & Neustadt, P.C.

(57) ABSTRACT

A coating composition comprising a fluorine-containing compound of the following formula 1, a polyisocyanate, water and an organic solvent:

$$R^f\text{—}Q\text{—}A \qquad 1$$

wherein $R^f$ is a monovalent fluorine-containing organic group having from 2 to 20 carbon atoms, Q is a single bond or a bivalent linking group, and A is a group having a hydrogen atom reactive with an isocyanate group.

18 Claims, No Drawings

COATING COMPOSITION, TREATING METHOD AND TREATED SUBSTRATE

The present invention relates to a coating composition, a treating method employing the composition and a substrate treated by the treating method. More particularly, the present invention relates to a coating composition which is capable of forming a coating film excellent in water and oil repellency, antifouling properties and solvent resistance, on a substrate surface, and a substrate treated with such a composition.

It is common to treat a substrate surface with a composition containing a compound having water and oil repellency in order to impart oil and water repellency to the substrate surface. As such a composition, a composition is known wherein a polymer obtained by addition polymerization of an acrylic acid ester containing a fluoroalkyl group, or a compound obtained by an addition reaction of a polyisocyanate to a hydroxy compound containing a fluoroalkyl group, is made in the form of an aqueous dispersion or an organic solvent solution.

Further, an alkoxypolyalkylene fluorocarbamate is also known which is obtained by reacting a polyisocyanate, a fluorine compound, a hydrophilic reactant and water (JP-A-7-505190).

With conventional compositions, a crosslinking agent such as a melamine compound, a urea compound or a polyisocyanate may sometimes be added at the time of processing, but they have had drawbacks that even if such a crosslinking agent is added, it is difficult to attain firm bonding to the substrate, high density crosslinking can hardly be obtained, and the solvent resistance is inadequate.

Especially when they are used for treating a substrate having a flat surface made of e.g. a synthetic resin, an elastomer, a metal, a plant structural material, a ceramics or a stone material, or a base material with the surface flattened as coated by e.g. a synthetic resin or an elastomer, there has been a problem that the coating film formed on the substrate surface can not be maintained in a stable state after the treatment. For example, there has been a problem that the coating film is easily peeled or removed by wiping with an organic solvent, or the coating surface is easily soiled or modified by a substance having a substantial dissolving power such as cigarette nicotine or an adhesive agent of an adhesive tape.

It is an object of the present invention to provide a coating composition capable of forming a coating film which firmly bonds to a substrate surface and will not be peeled or removed even by an organic solvent, a treating method employing such a composition, and a treated substrate.

Namely, the present invention provides a coating composition comprising a fluorine-containing compound of the following formula 1, at least one polyisocyanate, water and at least one organic solvent:

wherein $R^f$ is a monovalent fluorine-containing organic group having from 2 to 20 carbon atoms, Q is a single bond or a bivalent linking group, and A is a group having a hydrogen atom reactive with an isocyanate group, a treating method employing such a composition, and a treated substrate.

Now, the present invention will be described in detail with reference to the preferred embodiments.

In the fluorine-containing compound of the formula 1 (hereinafter referred to as the fluorine-containing compound (1)) contained in the coating composition of the present invention, $R^f$ is a monovalent fluorine-containing organic group having from 2 to 20 carbon atoms.

In this specification, "a monovalent fluorine-containing organic group" means a monovalent organic group containing at least one fluorine atom. The monovalent fluorine-containing organic group is preferably "a monovalent fluorine-containing hydrocarbon group" which is a group having at least one hydrogen atom of a hydrocarbon group substituted by a fluorine atom.

Further, the monovalent fluorine-containing hydrocarbon group may be "a monovalent fluorine-containing aromatic hydrocarbon group" having at least one hydrogen atom of a monovalent aromatic hydrocarbon group substituted by a fluorine atom, or "a monovalent fluorine-containing aliphatic hydrocarbon group" having at least one hydrogen atom of a monovalent aliphatic hydrocarbon group substituted by a fluorine atom. Preferred is a monovalent fluorine-containing aliphatic hydrocarbon group. Further, the monovalent fluorine-containing hydrocarbon group may have at least one etheric oxygen atom or thioetheric sulfur atom inserted between the carbon-carbon bond.

The carbon number of the monovalent fluorine-containing hydrocarbon group is preferably from 2 to 18, particularly preferably from 4 to 12. Further, the carbon number of the monovalent fluorine-containing aromatic hydrocarbon group is preferably from 6 to 12, particularly preferably from 6 to 8.

When $R^f$ is a monovalent fluorine-containing aliphatic hydrocarbon group, it is preferably "a fluorine-containing alkyl group" having at least one hydrogen atom of an alkyl group substituted by a fluorine atom, particularly preferably "a polyfluoroalkyl group" having at least two hydrogen atoms of an alkyl group substituted by fluorine atoms. In the case of a polyfluoroalkyl group, it is preferred that a fluorine atom is bonded to the carbon atom of $R^f$ which is bonded to Q. It is preferred that 1 to 3 fluorine atoms are bonded to a carbon atom present at a terminal of $R^f$.

When $R^f$ is a polyfluoroalkyl group, the carbon number is preferably from 2 to 20, particularly preferably from 2 to 18, most preferably from 4 to 12. Further, such a polyfluoroalkyl group may have at least one etheric oxygen atom or thioetheric sulfur atom inserted between the carbon-carbon bond of the alkyl group.

When $R^f$ is a polyfluoroalkyl group, the fluorinated ratio of the polyfluoroalkyl group, i.e. the proportion of fluorine atoms in the polyfluoroalkyl group, is preferably at least 60%, particularly preferably at least 80%, when represented by [(number of fluorine atoms in the polyfluoroalkyl group)/ (number of hydrogen atoms in the alkyl group having the same carbon number corresponding to the fluoroalkyl group)]×100%. Further, the polyfluoroalkyl group is preferably a perfluoroalkyl group, whereby said fluorinated ratio is substantially 100%.

Further, the polyfluoroalkyl group may have a linear structure or a branched structure, preferably a linear structure. In the case of a branched structure, the branched portion preferably has a short chain having from 1 to 3 carbon atoms. The perfluoroalkyl group may have a linear structure or a branched structure, preferably a linear chain group of the formula $CF_3(CF_2)_n-$, wherein n is preferably an integer of from 3 to 15, particularly preferably an integer of from 5 to 11. Further, $R^f$ may be a mixture of two or more types having different carbon numbers.

Further, when $R^f$ is a monovalent fluorine-containing aromatic hydrocarbon group, it is preferably a group having at least one hydrogen atom in a monovalent aromatic hydrocarbon group containing a phenyl group substituted by a fluorine atom. The monovalent aromatic hydrocarbon group containing a phenyl group is preferably an aryl group, an aralkyl group such as a benzyl group, or a group having a lower alkyl group substituted on such a group.

The following structures may be mentioned as specific examples for $R^f$ in the fluorine-containing compound (1). The following examples include "structural isomeric groups" which are structurally different groups having the same molecular formula.

$C_2F_5$—, $C_3F_7$— [including both $CF_3(CF_2)_2$— and $(CF_3)_2CF$—], $C_4F_9$— [including $CF_3(CF_2)_3$—, $(CF_3)_2CFCF_2$—, $(CF_3)_3C$— and $CF_3CF_2CF(CF_3)$—], $C_5F_{11}$— [including structural isomeric groups such as $CF_3(CF_2)_4$—, $(CF_3)_2CF(CF_2)_2$—, $(CF_3)_3CCF_2$—, and $CF_3CF_2CF(CF_3)CF_2$—], $C_6F_{13}$— [including structural isomeric groups such as $CF_3(CF_2)_2C(CF_3)_2$—], $C_8F_{17}$—, $C_{10}F_{21}$—, $C_{12}F_{25}$—, $C_{15}F_{31}$—, $H(CF_2)_t$— wherein t is an integer of from 2 to 18, and $(CF)_2CFC_sF_{2s}$— wherein s is an integer of from 1 to 15.

$CF_3(CF_2)_4OCF(CF_3)$—, $F[CF(CF_3)CF_2O]_sCF(CF_3)CF_2CF_2$—, $F[CF(CF_3)CF_2O]_tCF(CF_3)$—, $F[CF(CF_3)CF_2O]_uCF_2CF_2$—, $F[CF_2CF_2CF_2O]_vCF_2CF_2$—, $F[CF_2CF_2O]_wCF_2CF_2$—, wherein each of s and t is an integer of from 1 to 10, u is an integer of from 2 to 6, and each of v and w is an integer of from 1 to 11, $C_6F_5$—, $C_6F_5CF=CF$—, $CH_2=CHC_6F_{10}$—, $(C_pF_{2p+1})(C_qF_{2q+1})C=C(C_rF_{2r+1})$— wherein each of p, q and r is an integer of from 0 to 3, provided that p+q+r is an integer of from 2 to 10.

Q in the fluorine-containing compound (1) is a single bond or a bivalent linking group. When Q is a single bond, such means that $R^f$ and A are directly bonded to each other.

When Q is a bivalent linking group, Q is preferably a bivalent linking group containing no fluorine atom. Q is preferably a bivalent hydrocarbon group having from 1 to 22 carbon atoms, or a bivalent hydrocarbon group containing an atom inert to the reaction of the present invention. When Q is a bivalent hydrocarbon group containing an inert atom, it may, for example, be a bivalent hydrocarbon group containing an etheric oxygen atom or thioetheric sulfur atom, or a bivalent hydrocarbon group containing a nitrogen atom to which a hydrogen atom reactive with an isocyanate group is not bonded.

As the bivalent linking group, the following groups may be mentioned. In the following formulae, each of n and m is an integer of at least 0, n+m is an integer of from 1 to 22, $R^f$ is $C_xH_{2x+1}$— wherein x is an integer of from 1 to 3, y is an integer of from 1 to 10, and $\Phi^1$ is a 1,4-phenylene group or a 1,3-phenylene group.

—$(CH_2)_{n+m}$—, —$(CH_2)_nCONH(CH_2)_m$—, —$(CH_2)_nO(CH_2)_m$—, —$(CH_2)_nS(CH_2)_m$—, —$(CH_2)_nOCONH(CH_2)_m$—, —$(CH_2)_nNHCONH(CH_2)_m$—, —$(CH_2)_nSO_2NR'(CH_2)_m$—, —$(CH_2)_nCHOH(CH_2)_m$—, —$OCH_2CH_2CH_2$—, and —$O\Phi^1CO(OCH_2CH_2)_y$—.

Further, —$(CH_2)_nCONH(CH_2)_m$— is preferably one wherein n is from 0 to 4, and m is from 2 to 4, and —$(CH_2)_nSO_2NR'(CH_2)_m$— is preferably one wherein n is from 0 to 4, m is from 2 to 4, and R' is an ethyl group or a propyl group. Likewise, —$(CH_2)_nCHOH(CH_2)_m$— is preferably one wherein each of n and m is 1, and —$O\Phi^1CO(OCH_2CH_2)_y$— is preferably one wherein y is from 0 to 5. It is preferred that on the left side of the bivalent linking group, $R^f$ is bonded, and on the right side, A is bonded.

Q is preferably a bivalent linking group, particularly preferably a bivalent hydrocarbon group having from 1 to 22 carbon atom, more preferably an alkylene group having from 1 to 22 carbon atoms. The alkylene group may have a linear structure or a branched structure, preferably a linear structure. In the case of a branched structure, the branched moiety is preferably a short chain having from 1 to 3 carbon atoms. Further, Q is preferably —$(CH_2)_{n+m}$—, particularly preferably one wherein n+m is from 2 to 6, i.e. an ethylene group to a hexamethylene group.

A in the formula 1 for the fluorine-containing compound is preferably a hydroxyl group, an amino group, an alkylamino group or a carboxyl group, particularly preferably a hydroxyl group, from the viewpoint of the solubility of the fluorine-containing compound (1) in an organic solvent, efficiency for the production and the cost.

The following compounds may be mentioned as specific examples for the fluorine-containing compound (1) in the present invention. In the following formulae, $\Phi_2$ is a 1,4-phenylene group or a 1,3-phenylene group.

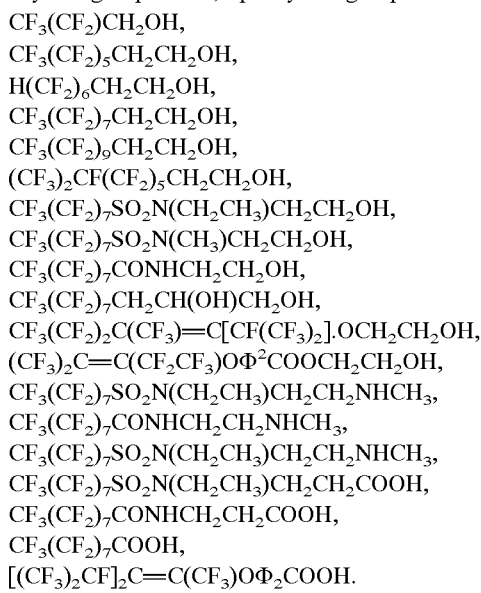

The polyisocyanate in the present invention is a compound containing more than one isocyanate group, and such compounds may be used alone or in combination as a mixture of two or more of them. When only one type of the polyisocyanate is employed, the number of isocyanate groups contained in one molecule is at least 2, preferably from 2 to 4. When two or more polyisocyanates are employed, they are preferably compounds wherein the average number of isocyanate groups per molecule is at least 1.8, particularly preferably from 2 to 4. Further, the isocyanate content in the polyisocyanate is at least 2 wt %, particularly preferably at least 5 wt %.

The polyisocyanate may be so-called yellowing or non-yellowing polyisocyanate, or yellowing and non-yellowing polyisocyanates may be used in combination. For example, when a polyisocyanate having a high reactivity is required, a yellowing polyisocyanate is preferred. On the other hand, when a polyisocyanate which is stable against light and not susceptible to coloring, is required, a non-yellowing polyisocyanate is preferred. The following compounds may be mentioned as specific examples for such a polyisocyanate.

Tolylene diisocyanate (TDI), diphenylmethane diisocyanate (MDI), crude MDI, naphthalene diisocyanate (NDI), xylylene diisocyanate (XDI), methylenebis(cyclohexyl isocyanate) ($H_{12}MDI$), hexamethylene diisocyanate (HDI), isophorone diisocyanate (IPDI), modified products thereof (such as isocyanurate-modified products, prepolymer-modified products or carbodiimide-modified products).

As the organic solvent in the present invention, an organic solvent which does not contain a hydrogen atom reactive with an isocyanate group, is preferred. As such an organic solvent, the following examples may be mentioned.

An ester type solvent such as ethyl acetate (AcOEt), isopropyl acetate, n-butyl acetate, 3-methyl-3-methoxybutyl acetate or propylene glycol diacetate, a ketone type solvent such as acetone, methyl ethyl ketone (MEK), methyl isobutyl ketone or cyclohexanone, a nitrogen-containing solvent such as dimeLhylformamide or acetonitrile, an aromatic solvent such as toluene or xylene, and a halogen type solvent such as methylene chloride, 1,1-dichloro-2,2,3,3,3-pentafluoropropane, perfluoro(2-butyltetrahydrofuran) or perfluoropolyether.

The organic solvent may be suitably selected from the viewpoint of e.g. the solubility of the fluorine-containing compound (1), the polyisocyanate or the like, the evaporation rate, the film-forming property, the working environment, the external environment, the recovery system and the capacity, and one or more solvents may be employed.

The water in the coating composition of the present invention reacts with the polyisocyanate and thus serves to promote the crosslinking reaction. The amount of the water is preferably from 40 to 10,000 ppm, particularly preferably from 80 to 2,000 ppm, in the coating composition. If the water content in the coating composition is too small, the solvent resistance of the resulting coating film tends to be inadequate, and if it is too much, the resulting coating film tends to undergo foaming, whereby the appearance of the coating film is likely to be impaired, or the reaction between the fluorine-containing compound and the polyisocyanate is likely to be impaired, whereby no adequate water and oil repellency or antifouling property tends to be obtained.

Further, the coating composition of the present invention may contain a polyol in addition to the above essential components. As such a polyol, a polyether type polyol or a polyester type polyol is preferred. As the polyether type polyol, a diol or a triol is preferred. As the diol, a polyoxyalkylene polyol is preferred, and particularly preferred is polyoxypropylene diol, polyoxyethylene diol, polyoxypropylene polyoxyethylene diol or polyoxytetramethylene diol.

As the triol, glycerol or an adduct of trimethylolpropane with a polyoxyalkylene polyol, is preferred. As the polyoxyalkylene polyol, polyoxyethylene diol, polyoxypropylene diol or polyoxyethylenepolyoxypropylene diol is preferred.

The polyester type polyol may, for example, be a polycondensation type polyester polyol obtained by reacting a polybasic acid with a glycol, or a ring-opening polymerization type polyester polyol obtainable by ring-opening polymerization of a cyclic compound. The polybasic acid may, for example, be adipic acid, phthalic acid or maleic acid. The glycol may, for example, be ethylene glycol, propylene glycol, butylene glycol, diethylene glycol hexylene glycol, neopentyl glycol, trimethylolpropane, glycerol or pentaerythritol. The cyclic compound may, for example, be ε-caprolactone and β-methyl-δ-valerolactone.

Such polyols may be used alone or in combination of two or more of them. The type of the polyol is preferably selected from the viewpoint of the mechanical and physical properties such as the hardness of the coating film, the stretchability and the flexural modulus. Further, in order to maintain the film-forming property during the coating of the coating composition, a defoaming agent or a leveling agent may also be incorporated.

Further, to adjust the progress of the addition reaction, a catalyst such as an amine or an organic tin compound may be added to the coating composition of the present invention.

The coating composition of the present invention can be prepared by adding the fluorine-containing compound (1) and the polyisocyanate, water and, if necessary, a polyol or additives, to the organic solvent.

For the coating composition of the present invention, it is particularly preferred that the fluorine-containing compound (1) and the polyisocyanate are separately prepared and made into a composition at the time of treatment, to secure the stability of the composition. In such a case, it is preferred that the fluorine-containing compound (1) is made into a solution of the organic solvent in the present invention. Further, when other compounds are incorporated as the case requires, it is preferred to dissolve them together with the fluorine-containing compound (1) in the organic solvent to obtain a solution. Further, it is also preferred that the water is also added to the organic solvent containing the fluorine-containing compound (1).

The amounts of the respective components in the coating composition are preferably as follows.

The amount of the fluorine-containing compound (1) is preferably from 0.001 to 15 wt %, particularly preferably from 0.01 to 10 wt %, to the organic solvent. If the amount of the fluorine-containing compound is too small, there will be a problem that the water and oil repellency and the antifouling property tend to deteriorate, and if the amount of the fluorine-containing compound is too much, the film-forming property tends to be poor, thus leading to a problem that it tends to be difficult to obtain a uniform film. On the other hand, if the treating amount is increased to gain extra effects, there will be a problem that the materials are consumed more than necessary, and the amount of the solvent tends to be particularly large, whereby the recovery cost increases.

The amount of the polyisocyanate is preferably from 0.1 to $1 \times 10^4$ wt %, particularly preferably from 10 to is 2,000 wt %, to the amount of the fluorine compound (1). If the amount of the polyisocyanate is too small, the crosslinking reaction tends to be inadequate, whereby there will be a problem that no adequate water and oil repellency, antifouling property or solvent resistance tends to be obtained. On the other hand, if the amount of the polyisocyanate is too much, the amount of $R^f$ on the treated film surface tends to be small, whereby there will be a problem that the water and oil repellency and the antifouling property tend to deteriorate.

Further, when a polyol is incorporated, its amount is preferably from 0.1 to 150 wt %, particularly preferably from 1 to 80 wt %, to the amount of the polyisocyanate. If the amount of the polyol is too small, the intended adjustment of the mechanical and physical properties tends to be difficult, and if the amount of the polyol is too much, the reaction of isocyanate groups of the polyisocyanate tends to proceed with the polyol, whereby no adequate crosslinking reaction with the fluorine-containing compound may proceed.

The coating composition of the present invention is coated on a substrate surface. The coating method is selected depending upon the surface area and the state of the substrate, and may, for example, be roll coating, curtain flow coating, knife coating, gravure coating, dip coating, manual coating, air spraying or airless spraying.

The amount of the coating composition of the present invention coated on the substrate surface is preferably within a range of from 0.001 to 100 g/m². If the coated amount is less than 0.001 g/m², the water and oil repellency tends to be inadequate, and if the coated amount exceeds 100 g/m², not only the material is wasted unnecessarily, but also the film-forming property tends to deteriorate, whereby the appearance tends to be poor.

The substrate may be a substrate made of a synthetic resin, an elastomer, a metal, a plant structural material or a ceramic. The surface of the substrate does not particularly require pretreatment or the like, but it may be pre-treated as the case requires. Further, the substrate surface may be flat or may have a curvature.

After coating the coating composition, the fluorine-containing compound (1), the polyisocyanate and water are reacted to impart excellent water and oil repellency and antifouling property to the substrate surface. The reaction of the fluorine-containing compound (1), the polyisocyanate and water can be accomplished by drying. The drying condition may be drying at room temperature or under heating.

The treated substrate obtained by the treatment with the coating composition of the present invention will have excellent water and oil repellency imparted on the surface and thus can be used for various applications in which such a property is required. The treated substrate may be used as it is, or may be used as assembled with other articles. Applications of the treated substrate include, for example, kitchen utensils, machine parts, parts of vehicles, furniture, synthetic resins, stone building materials, statues or the like made of stone building materials, ceramic building materials, and statues or the like of ceramics.

The reason as to why the treated substrate of the present invention exhibits such excellent water and oil repellency is not clearly understood, but it is considered that the polycyanate, the fluorine-containing compound and water are reacted to form a strong network structure and thereby form a coating film made of "a spiked water and oil repellent polymer" wherein numerous monovalent fluorine-containing organic groups stand on the surface with the network structure as the base. Further, it is considered that the coating film exhibits a strong adhesion to the substrate, whereby the property is excellent also in the durability.

Now, the present invention will be described in further detail with reference to Examples. However, it should be understood that the present invention is by no means restricted to such specific Examples.

EXAMPLES 1 to 12 (Working Examples of the present invention)

An organic solvent as identified in Table 1 was prepared and divided into two equal portions.

To one portion of the solvent, the fluorine-containing compound, the polyol (only in Examples 8 and 9) and dibutyltin dilaurate (DBTDL) as a catalyst (only in Examples 2 to 5, 7 and 12) were added and mixed. As the polyol in Example 8, Excenol 330, tradename, manufactured by Asahi Glass Company Ltd. (hydroxyl value: 510 mgKOH/g) was added so that the concentration in the composition would be 0.17 wt %. As the polyol in Example 9, Excenol 420, tradename, manufactured by Asahi Class Company Ltd. (hydroxyl value: 280 mgKOH/g) was added so that the concentration in the composition would be 0.26 wt %. To the other portion of the solvent, the polyisocyanate was added and mixed. The detail of the polyisocyanate is shown in Table 1.

The water contents of the solvent solution containing the fluorine-containing compound and the solvent solution containing the polyisocyanate, were, respectively, measured by a Karl Fischer's method. Then, a predetermined amount of water was added by a microsyringe to the solvent solution containing the fluorine-containing compound. Immediately before the evaluation, the two organic solvent solutions were sealed not to let a dust enter and mixed to obtain a composition. The types and concentrations (unit: wt %) of the organic solvent, the fluorine-containing compound, the polyisocyanate and the catalyst in the composition, and the amount of water are summarized in Table 2.

The obtained composition was coated on the substrate as identified in Table 3 in an amount as identified in Table 3. A bar coater was employed for the coating. Further, the substrate after the coating was dried under the conditions as identified in Table 3. With respect to the treated substrate, various evaluations were carried out, and the results are shown in Table 4.

TABLE 1

| Trade name | Manufacturer | NCO content |
|---|---|---|
| CORONATE HX | Nippon Polyurethane K.K. | 21.3% |
| DURANATE D-101 | Asahi Chemical Industry Co., Ltd. | 19.6% |
| PAPI | Kasei Upjohn Co. | 31.5% |
| ISONATE 149L | Kasei Upjohn Co. | 29.2 |
| CORONATE 2507 | Nippon Polyurethane K.K. | 11.6% |
| DURANATE 17B60CX | Asahi Chemical Industry Co., Ltd. | 9.4% |

EXAMPLES 13 to 16 (Comparative Examples)

A composition containing the following compound C, D or E in an amount as identified in Table 2, was prepared. The obtained composition was coated on a substrate as identified in Table 3 in an amount as identified in Table 3. A bar coater was employed for the coating. Further, the substrate after coating was dried under the conditions as identified in Table 3. With respect to the obtained treated substrate, various evaluations were carried out, and the results are shown in Table 4.

Compound C: A copolymer comprising 50 wt % of polymerized units of $CF_3(CF_2)_sCH_2CH_2CH_2OCOCH=CH_2$ (a 1:1 (weight ratio) mixture of one wherein s is 7 and one wherein s is 9), 28 wt % of polymerized units of benzyl methacrylate, 20 wt % of polymerized units of dioctyl maleate, and 2 wt % of polymerized units of $CH_2=C(CH_3)COOCH_2CH_2A^r$ wherein $A^r$ is an aziridinyl group.

Compound D: A copolymer containing 2 wt % of polymerized units of 2-hydroxyethyl methacrylate instead of the polymerized units of $CH_2=C(CH_3)COOCH_2CH_2A^r$ in copolymer D.

Compound E: $[CF_2(CF_2)_sCH_2CH_2OCONH\Phi^3]_2CH_2$ wherein $\Phi^3$ is a 1,4-phenylene group.

TABLE 2

| Example No. | Organic solvent: wt % | Fluorine-containing compound: wt % | Polyisocyanate:wt % | Water content: ppm | DBTDL: ppm |
|---|---|---|---|---|---|
| 1 | AcOEt:97 | A:2.23 | PAPI:0.77 | 95 | 0 |
| 2 | AcOEt:97 | A:1.98 | CORONATE HX:1.02 | 280 | 300 |
| 3 | AcOEt:97 | A:1.93 | DURANATE D-101:1.07 | 280 | 300 |
| 4 | MEK:97 | A:1.93 | DURANATE D-101:1.07 | 310 | 300 |
| 5 | MEK:97 | B:2.05 | CORONATE HX:0.95 | 270 | 300 |

TABLE 2-continued

| Example No. | Organic solvent: wt % | Fluorine-containing compound: wt % | Polyisocyanate:wt % | Water content: ppm | DBTDL: ppm |
|---|---|---|---|---|---|
| 6 | AcOEt:97 | A:1.80 | CORONATE HX:0.69 and ISONATE 149L0.51 | 80 | 0 |
| 7 | AcOEt:97 | A:1.70 | CORONATE HX:1.03 | 280 | 300 |
| 8 | AcOEt:97 | A:1.98 | ISONATE 149L:0.85 | 90 | 0 |
| 9 | MEK:97 | B:1.87 | PAPI:0.87 | 105 | 0 |
| 10 | MEK:97 | A:1.55 | CORONATE 2507:1.45 | 95 | 0 |
| 11 | MEK:97 | A:1.39 | DURANATE 17B60CX:1.61 | 110 | 0 |
| 12 | AcOEt:97 | A:1.98 | CORONATE HX:1.02 | <25 | 300 |
| 13 | MEK:99.7 | C:0.3 | — | <15 | 0 |
| 14 | MEK:99.7 | D:0.26 | ISONATE 149L:0.04 | <15 | 0 |
| 15 | MEK:99.7 | E:0.3 | — | <15 | 0 |

Compound A: $CF_3(CF_2)_sCH_2CH_2OH$ (A 1:1 (weight ratio) mixture of one wherein s is 7 and one wherein s is 9).
Compound B: $CF_3(CF_2)_7SO_2N(C_2H_5)CH_2CH_2OH$.

TABLE 3

| Example No. | Substrate | Coated amount of composition | Drying conditions |
|---|---|---|---|
| 1 | White polyester film having a thickness of 100 μm. | 3 g/m² | Air drying at 20° C. for 24 hrs. |
| 2 | Same as above | 3 g/m² | Air drying at 20° C. for 48 hrs. |
| 3 | Same as above | 3 g/m² | At 120° C. for 15 min. |
| 4 | Aluminum foil having a thickness of 15 μm. | 3 g/m² | At 120° C. for 15 min. |
| 5 | White polyester film having a thickness of 100 μm. | 3 g/m² | Air drying at 20° C. for 48 hrs. |
| 6 | Zelkova (keyaki) plate having a thickness of 5 mm. | 20 g/m² | Air drying at 20° C. for 48 hrs. |
| 7 | Marble plate having a thickness of 5 mm. | 10 g/m² | Air drying at 20° C. for 48 hrs. |
| 8 | White polyester film having a thickness of 100 μm. | 3 g/m² | Air drying at 20° C. for 48 hrs. |
| 9 | Same as above | 3 g/m² | Air drying at 20° C. for 48 hrs. |
| 10 | Aluminum foil having a thickness of 15 μm. | 3 g/m² | At 130° C. for 30 min. |
| 11 | Same as above | 3 g/m² | At 150° C. for 30 min. |
| 12 | White polyester film having a thickness of 100 μm. | 3 g/m² | Air drying at 20° C. for 48 hrs. |
| 13 | Same as above | 3 g/m² | Air drying at 20° C. for 48 hrs. |
| 14 | Same as above | 3 g/m² | At 120° C. for 15 min. |
| 15 | Same as above | 3 g/m² | Air drying at 20° C. for 48 hrs. |

Evaluation Methods
(1) Contact Angle (unit: degree)
The contact angle against water or liquid paraffin (P) was measured by a droplet method. The value provided with symbol "<" means slightly less than the value.
(2) Evaluation of the Solvent Resistance
A cotton gauze piece was sufficiently impregnated with IPA (isopropyl alcohol) or MEK (methyl ethyl ketone), and it was gently pressed against the treated substrate and reciprocated 10 times for rubbing. Then, the substrate was left to stand for 60 minutes to evaporate the solvent, whereupon the contact angle was measured. The results are shown in Table 4. In Table 4, "IPA contact angle" represents the contact angle on the treated substrate surface rubbed with IPA, and "MEK contact angle" represents the contact angle on the treated substrate surface rubbed with MEK.
(3) Evaluation of the Peeling Property
An adhesive tape was bonded to a treated substrate and maintained in a hot air furnace of 45° C. for 24 hours. The sample withdrawn was left to stand at room temperature for about 40 minutes, whereupon the adhesive tape was quickly peeled off, and the state of the adhesive tape was evaluated by the following standards.
○: The adhesive tape was peeled with slight resistance.
X: Heavy resistance was felt when the adhesive tape was peeled, or the coated surface layer was also peeled.
(4) Cigarette Nicotine Soil Resistance (SR property)
A tetragonal pyramid wooden roof with a slope of 35°, was attached to a square wooden frame with one inner side being 28 cm×a height of 25 cm. At the center along the lower edge of each wall of the wooden frame, a hole having a diameter of 3 mm was formed as an air inlet, and a similar hole was formed at the forward end of the tetragonal pyramid roof to serve as a smoke outlet. On the wall surface, a treated substrate was bonded.
Then, three cigarettes (Mildseven, tradename, Nippon Tobacco Sangyo K.K.) were lighted and set at the center of the combustion box, as placed on an ashtray. The box was left as filled with the smoke, and 1 hour later, another three cigarettes were lighted and placed in the combustion box. The same operation was repeated eight times during the day time. Further, during the night time, the box was left non-opened for 16 hours until the next morning. This series of operations was carried out for 3 days, and in the morning of the fourth day, the treated substrate was taken out.
The treated substrate surface was wiped with a dry cotton cloth (dry wiping) or with a cloth impregnated sufficiently with water (water wiping), and the surface state was evaluated by the following standards. An evaluation provided with a symbol "-" means slightly inferior to the evaluation standard.
○: Easily wiped off.
Δ: Wiped off with substantial force.
X: Cigarette nicotine remained on the surface even when wiped with substantial force.

TABLE 4

| | Initial contact angle | | IPA contact angle | | MEK contact angle | | Peeling property | SR property | |
|---|---|---|---|---|---|---|---|---|---|
| | | | | | | | | Dry wiping | Water wiping |
| Example No. | Water | P | Water | P | Water | P | | | |
| 1 | 108 | 78 | 108 | 78 | 108 | 78 | ○ | ○ | ○ |
| 2 | 108 | 80 | 108 | 78 | 108 | 78 | ○ | ○ | ○ |
| 3 | 105 | 76 | 105 | 78 | 105 | 78 | ○ | ○ | ○ |
| 4 | 103 | 76 | 103 | 78 | 103 | 78 | ○- | ○ | ○ |
| 5 | 108 | 80 | 108 | 78 | 108 | 78 | ○- | ○ | ○ |

TABLE 4-continued

| Example No. | Initial contact angle Water | P | IPA contact angle Water | P | MEK contact angle Water | P | Peeling property | SR property Dry wiping | SR property Water wiping |
|---|---|---|---|---|---|---|---|---|---|
| 6 | 108 | 76 | 108 | 78 | 108 | 78 | ○ | ○ | ○ |
| 7 | 108 | 76 | 108 | 78 | 108 | 78 | ○ | ○ | ○ |
| 8 | 105 | 76 | 106 | 78 | 108 | 78 | ○ | ○ | ○ |
| 9 | 108 | 76 | 108 | 78 | 108 | 78 | ○- | ○ | ○ |
| 10 | 105 | 76 | 108 | 78 | 108 | 78 | ○ | ○ | ○ |
| 11 | 105 | 76 | 108 | 78 | 108 | 78 | ○ | ○ | ○ |
| 12 | 108 | 78 | 98 | 70 | 90 | 63 | Δ | Δ | Δ |
| 13 | 108 | 78 | 68 | <20 | 65 | <20 | X | X | X |
| 14 | 108 | 78 | 77 | <20 | 75 | <20 | X | X | X |
| 15 | 108 | 78 | 75 | <20 | 73 | <20 | X | X | X |

EXAMPLES 16 to 19 (Reference Examples)

With respect to non-treated substrates, the same evaluations as above were carried out. The results are shown in Table 5.

TABLE 5

| Example No. | Non-treated substrate | Initial contact angle Water | P | Peeling property | SR property Dry wiping | SR property Water wiping |
|---|---|---|---|---|---|---|
| 16 | White polyester film having a thickness of 100 μm. | 65 | <20 | X | X | Δ |
| 17 | Aluminum foil having a thickness of 15 μm. | 70 | <20 | X | X | Δ |
| 18 | Zelkova (keyaki) plate having a thickness of 5 mm. | 43 | <20 | X | X | Δ |
| 19 | Marble plate having a thickness of 5 mm. | <20 | <20 | X | X | X |

The coating composition of the present invention is an excellent composition which is capable of imparting excellent water and oil repellency and antifouling properties to a substrate surface. The coating film obtained by treatment with the composition has excellent film strength and adhesion to the substrate and thus exhibits excellent solvent resistance, abrasion durability and peel resistance. Accordingly, a treated substrate obtained by treating the substrate surface with the coating composition of the present invention can be used for various applications where such properties are required.

What is claimed is:

1. A coating composition comprising a fluorine-containing compound of the following formula 1, at least one polyisocyanate, water and at least one organic solvent:

$$R^f\text{—}Q\text{—}A \quad \quad 1$$

wherein $R^f$ is a monovalent fluorine-containing organic group having from 2 to 20 carbon atoms, Q is a single bond or a bivalent linking group, and A is a group having a hydrogen atom reactive with an isocyanate group, wherein the amount of the water in the coating composition is from 40 to 10,000 ppm.

2. The composition according to claim 1, wherein the coating composition further contains at least one polyol.

3. The composition according to claim 1, wherein A in the fluorine-containing compound of the formula 1 is a hydroxyl group.

4. The composition according to claim 1, wherein the fluorine-containing compound of the formula 1 is a compound containing a perfluoroalkyl group having from 8 to 14 carbon atoms.

5. The composition according to claim 1, wherein the polyisocyanate is an isocyanurate-modified product or a prepolymer-modified product of an aliphatic diisocyanate, or crude diphenylmethane diisocyanate.

6. The composition according to claim 1, wherein the coating composition further contains at least one polyol.

7. The composition according to claim 6, wherein A in the fluorine-containing compound of the formula 1 is a hydroxyl group.

8. The composition according to claim 6, wherein the fluorine-containing compound of the formula 1 is a compound containing a perfluoroalkyl group having from 8 to 14 carbon atoms.

9. The composition according to claim 6, wherein the polyisocyanate is an isocyanurate-modified product or a prepolymer-modified product of an aliphatic diisocyanate, or crude diphenylmethane diisocyanate.

10. The composition according to claim 1, wherein A in the fluorine-containing compound of the formula 1 is a hydroxyl group.

11. The composition according to claim 10, wherein the fluorine-containing compound of the formula 1 is a compound containing a perfluoroalkyl group having from 8 to 14 carbon atoms.

12. The composition according to claim 10, wherein the polyisocyanate is an isocyanurate-modified product or a prepolymer-modified product of an aliphatic diisocyanate, or crude diphenylmethane diisocyanate.

13. The composition according to claim 1, wherein the fluorine-containing compound of the formula 1 is a compound containing a perfluoroalkyl group having from 8 to 14 carbon atoms.

14. The composition according to claim 13, wherein the polyisocyanate is an isocyanurate-modified product or a prepolymer-modified product of an aliphatic diisocyanate, or crude diphenylmethane diisocyanate.

15. The composition according to claim 1, wherein in the coating composition, the amount of the fluorine-containing compound is from 0.001 to 15 wt % to the organic solvent, and the amount of the polyisocyanate is from 0.1 to $1\times10^4$ wt % to the fluorine-containing compound.

16. A method for treating a substrate surface, which comprises coating the composition as defined in claim 1 on a substrate surface, and after removing the solvent, reacting the fluorine-containing compound of the formula 1 and the polyisocyanate by air-drying on the substrate surface.

17. A substrate treated by the treating method as defined in claim 16.

18. The substrate according to claim 17, wherein the substrate is a substrate made of a synthetic resin, an elastomer, a metal, a plant structural material, a ceramics or a stone material.

* * * * *